Sept. 21, 1948.                    A. COX                       2,449,769
              MODIFIED OPTICAL OBJECTIVE HAVING A SIMPLE
              DIVERGENT COMPONENT AIR SPACED BETWEEN
                 TWO COMPOUND CONVERGENT COMPONENTS
                        Filed April 18, 1946
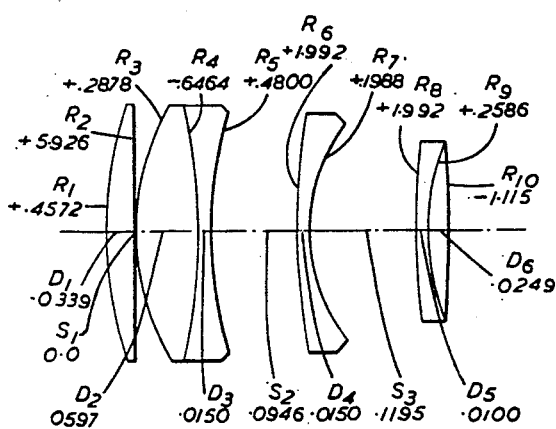
*Inventor*
By Arthur Cox
Emery, Holcombe & Blair
              *Attorney*

Patented Sept. 21, 1948

2,449,769

UNITED STATES PATENT OFFICE 2,449,769

MODIFIED OPTICAL OBJECTIVE HAVING A SIMPLE DIVERGENT COMPONENT AIR SPACED BETWEEN TWO COMPOUND CONVERGENT COMPONENTS

Arthur Cox, Leicester, England, assignor to Taylor, Taylor & Hobson Limited, Leicester, England, a company of Great Britain Application April 18, 1946, Serial No. 663,087
In Great Britain March 13, 1946

12 Claims. (Cl. 88—57)

This invention relates to an optical objective of the type comprising a divergent member located between and spaced from two convergent members. This well-known type of objective has been modified in many ways for a variety of purposes, and the present invention is concerned particularly with one modification in which the divergent member is in the form of a simple element and the rear convergent member is in the form of a doublet consisting of a biconvex convergent element cemented to a meniscus divergent element, whilst the front convergent member has two convergent components separated by a small air space, one of such components being compound and the other consisting of a simple element, the overall axial length from the front surface of the front member to the rear focal plane being less than the equivalent focal length of the objective so that the objective has the characteristics of a telephoto objective.

It should be made clear that the terms "front" and "rear" are herein employed, in accordance with usual convention, to relate to the sides of the objective respectively nearer to and further from the longer conjugate.

The present invention has for its object to provide an objective of the kind just mentioned well-corrected for a relatively high aperture such as F/3 or F/3.5, and having a back focal length greater than half the equivalent focal length of the objective, so that it may be employed for instance in reflex cameras wherein the mirror movement does not permit a short back focal length.

In the objective according to the present invention the simple component in the front member is located in front of the compound component of such member, and the divergent element in the convergent rear member is made of a material having mean refractive index lower than and Abbé V number at least 10 higher than those of the material of the associated convergent element, the objective being corrected for spherical and chromatic aberrations, coma, astigmatism and field curvature. The Abbé V number of the material used for the convergent element in the rear member is conveniently not higher than 40.

The axial air separation between the divergent middle member and the convergent front member preferably lies between .07 and .12 times the equivalent focal length of the objective. The axial air separation between the divergent middle member and the convergent rear member preferably lies between 1.0 and 2.0 times that between the middle member and the front member.

The equivalent focal length of the convergent front member, incorporating both the simple component and the compound component, preferably lies between .25 and .5 times that of the whole objective.

The compound component in the front member will usually consist of a cemented doublet (although it is not essential for the cooperating internal contact surfaces in it to be cemented together or indeed to have exactly the same radius of curvature), and in the preferred form this doublet consists of a biconvex element cemented to a biconcave element made of a material having lower Abbé V number than that of the biconvex element. Preferably the mean refractive index of the material of the biconvex element is not less than and does not exceed by more than 0.25 that of the material of the biconcave element. The cemented surface is preferably concave to the front with radius of curvature lying between .4 and 2.0 times the equivalent focal length of the objective.

The simple component of the convergent front member is preferably of meniscus form with its front surface convex to the front and having a radius of curvature lying between .35 and .60 times the equivalent focal length of the objective. This component may conveniently be made of a material having Abbé V number not less than 48.

The front surface of the divergent middle member preferably has radius of curvature not less than 5 times and not more than 30 times that of the rear surface of the member. This member may conveniently be made of a material having Abbé V number not greater than 38.

The accompanying drawing shows one convenient practical example of objective according to the invention, and numerical data for this example are given in the following table, in which $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1, S_2, S_3$ represent the axial air separations between the components. The table also gives the mean refractive indices for the D-line and the Abbé V numbers of the materials used for the various elements.

Equivalent focal length 1.000    Relative Aperture F/3.5

| Radius | Thickness or Air Separation | Refractive Index $n_D$ | Abbé V Number |
|---|---|---|---|
| $R_1+.4572$ | $D_1\ .0339$ | 1.613 | 59.3 |
| $R_2+5.926$ | $S_1\ 0.0$ | | |
| $R_3+.2878$ | $D_2\ .0597$ | 1.613 | 59.3 |
| $R_4-.6464$ | $D_3\ .0150$ | 1.605 | 38.2 |
| $R_5+.4800$ | $S_2\ .0946$ | | |
| $R_6+1.992$ | $D_4\ .0150$ | 1.699 | 30.5 |
| $R_7+.1988$ | $S_3\ .1195$ | | |
| $R_8+1.992$ | $D_5\ .0100$ | 1.613 | 59.3 |
| $R_9+.2586$ | $D_6\ .0249$ | 1.652 | 33.5 |
| $R_{10}-1.115$ | | | |

The back focal length in this example is .510 times the equivalent focal length of the objective. The equivalent focal length of the convergent front member, incorporating both the simple component and the doublet, is .439 times that of the objective. The ratio of $S_3$ to $S_2$ is approximately 1.26. The ratio of $R_6$ to $R_7$ is approximately 10.

What I claim as my invention and desire to secure by Letters Patent is:

1. An optical objective corrected for the spherical and chromatic aberrations, coma, astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the axial air separation between the divergent middle member and the convergent front member lying between .07 and .12 times the equivalent focal length of the objective, whilst the axial air separation between the divergent middle member and the convergent rear member lies between 1.0 and 2.0 times that between the divergent middle member and the convergent front member.

2. An optical objective as claimed in claim 1, in which the equivalent focal length of the convergent front member lies between .25 and .5 times the equivalent focal length of the whole objective.

3. An optical objective as claimed in claim 1, in which the front surface of the divergent middle member has a radius of curvature not less than 5 times and not more than 30 times that of the rear surface of the member.

4. An optical objective as claimed in claim 1, in which the compound component in the convergent front member includes a cemented surface concave to the front with radius of curvature lying between .4 and 2.0 times the equivalent focal length of the objective.

5. An optical objective corrected for spherical and chromatic aberrations, coma astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the equivalent focal length of the convergent front member lying between .25 and .5 times the equivalent focal length of the whole objective.

6. An optical objective as claimed in claim 5, in which the axial air separation between the divergent middle member and the convergent front member lies between .07 and .12 times the equivalent focal length of the objective.

7. An optical objective as claimed in claim 5, in which the compound component in the convergent front member includes a cemented surface concave to the front with radius of curvature lying between .4 and 2.0 times the equivalent focal length of the objective.

8. An optical objective corrected for spherical and chromatic aberrations, coma astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the compound component in the convergent front member consisting of a biconvex element cemented in front of a biconcave element made of a material having lower Abbé V number than that of the associated biconvex element the cemented surface between such elements having a radius of curvature lying between .4 and 2.0 times the equivalent focal length of the objective.

9. An optical objective corrected for spherical and chromatic aberrations, coma astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the axial air separation between the divergent middle member and the convergent front member lying between .07 and .12 times the equivalent focal length of the objective, the compound component in the convergent front member consisting of a biconvex element cemented to a biconcave element made of a material having lower Abbé V number than that of the associated biconvex element.

10. An optical objective corrected for spherical and chromatic aberrations, coma, astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the axial air separation between the divergent middle member and the convergent front member lying between .07 and .12 times the equivalent focal length of the objective, the simple component of the convergent front member being of meniscus form with its front surface convex to the front and of radius of curvature between .35 and .60 times such equivalent focal length.

11. An optical objective corrected for spherical and chromatic aberrations, coma, astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the compound component in the convergent front member consisting of a biconvex element cemented to a biconcave element made of a material having lower Abbé V number than that of the associated biconvex element, the simple component in the convergent front member of meniscus form with its front surface convex to the front and of radius of curvature between .35 and .60 times the equivalent focal length of the objective.

12. An optical objective corrected for spherical and chromatic aberrations, coma, astigmatism and field curvature, and comprising a simple divergent member, a front convergent member consisting of a simple convergent component disposed in front of and slightly separated from a compound convergent component, and a rear convergent member in the form of a doublet having a biconvex convergent element cemented to a meniscus divergent element made of a material having mean refractive index lower than and Abbé V number at least 10 higher than those of the material of the associated convergent element, the axial air separation between the divergent middle member and the convergent front member lying between .07 and .12 times the equivalent focal length of the objective, the front surface of the divergent middle member having a radius of curvature not less than 5 times and not more than 30 times that of the rear surface of the member.

ARTHUR COX.

REFERENCES CITED

The following references are of record in the file of this patent:

UNITED STATES PATENTS

| Number | Name | Date |
| --- | --- | --- |
| 1,584,272 | Bertele | May 11, 1926 |
| 1,899,934 | Berek | Mar. 7, 1933 |
| 1,967,836 | Merte | July 24, 1934 |
| 2,076,686 | Tronnier | Apr. 13, 1937 |
| 2,336,300 | Schade | Dec. 7, 1943 |

FOREIGN PATENTS

| Number | Country | Date |
| --- | --- | --- |
| 803,679 | France | July 15, 1936 |